(12) United States Patent
Nagamine (10) Patent No.: US 6,760,957 B2
(45) Date of Patent: Jul. 13, 2004

(54) GROMMET

(75) Inventor: Noriyuki Nagamine, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/133,741

(22) Filed: Apr. 29, 2002

(65) Prior Publication Data

US 2002/0162195 A1 Nov. 7, 2002

(30) Foreign Application Priority Data

Apr. 27, 2001 (JP) ........................................ P2001-131914

(51) Int. Cl.[7] .......................... H01B 17/26; H02G 3/04; F16L 5/00; A44B 17/00
(52) U.S. Cl. ............................ 24/297; 24/295; 24/458; 24/517; 174/152 G; 174/153 G; 411/508; 411/510; 16/2.1
(58) Field of Search .......................... 24/297, 295, 517, 24/458, 662; 16/2.1; 411/508, 510; 174/152 G, 153 G (56) References Cited

U.S. PATENT DOCUMENTS

| 5,487,680 A | | 1/1996 | Yamanashi | |
| 5,635,678 A | * | 6/1997 | Yasukuni | 174/152 G |
| 5,739,475 A | * | 4/1998 | Fujisawa et al. | 174/153 G |
| 6,058,562 A | * | 5/2000 | Satou et al. | 16/2.1 |
| 6,088,874 A | * | 7/2000 | Nakata et al. | 16/2.1 |
| 6,339,196 B1 | * | 1/2002 | Uchida | 174/153 G |

FOREIGN PATENT DOCUMENTS

JP     1-124612     8/1989

OTHER PUBLICATIONS

Japanese Abstract No. 07296661, dated Nov. 10, 1995.

* cited by examiner

*Primary Examiner*—Victor Sakran
(74) *Attorney, Agent, or Firm*—Sughrue Mion, PLLC (57) ABSTRACT

A grommet is mounted on a panel of an automobile. The grommet includes a tubular body, a fitting portion, a flange portion, projected portions, and a lip. A wire harness is passed through the grommet body. The fitting portion is formed at an end of the grommet body, and is fitted in a hole in the panel. The flange portion includes a pair of straight portions, and a pair of arcuate portions. The pair of straight portions are spaced from each other in parallel. The pair of arcuate portions interconnect the pair of straight portions. The projected portions project outwardly from the straight portions, respectively. The lip is formed at an outer peripheral edge portion of the flange portion, and when the fitting portion is fitted in the hole, the lip is held in contact with the panel.

20 Claims, 6 Drawing Sheets

GROMMET

The present application is based on Japanese Patent Application No. 2001-131914, which is incorporated herein by reference.

BACKGROUND OF THE INVENTION

1. Field of the Invention

This invention relates to a grommet for mounting on a panel, forming a vehicle body of a vehicle such as an automobile, a wire harness being passed through the inside of this grommet.

2. Related Art

A wire harness is passed through a hole 103 (shown in FIG. 12) formed through a panel 102 (shown in FIGS. 11 and 12), forming a vehicle body of a vehicle such as an automobile, and for example, a grommet 101, shown in FIGS. 9 to 12, is used for the purpose of preventing moisture, such as water, from depositing on the wire harness. In the example shown in FIG. 12, the hole 103 is an elongate hole of a generally oval or elliptical shape.

The grommet 101, shown in FIGS. 9 to 12, is formed into a tubular shape, and is mounted on the panel 102, and the wire harness is passed through this grommet. From the viewpoint of the quality, the grommet 101 of this kind is required to be able to be easily fitted into the hole 103 and also to have a reliable sealing performance.

The grommet 101, shown in FIGS. 9 to 12, includes a grommet body 104 of a tubular shape, a fitting portion 105, a flange portion 106, and a lip 107. The fitting portion 105 is formed at an end of the grommet body 104, and is fitted in the hole 103. The flange portion 106 is formed at the end of the grommet body 104 at which the fitting portion 105 is formed.

Figure 9:
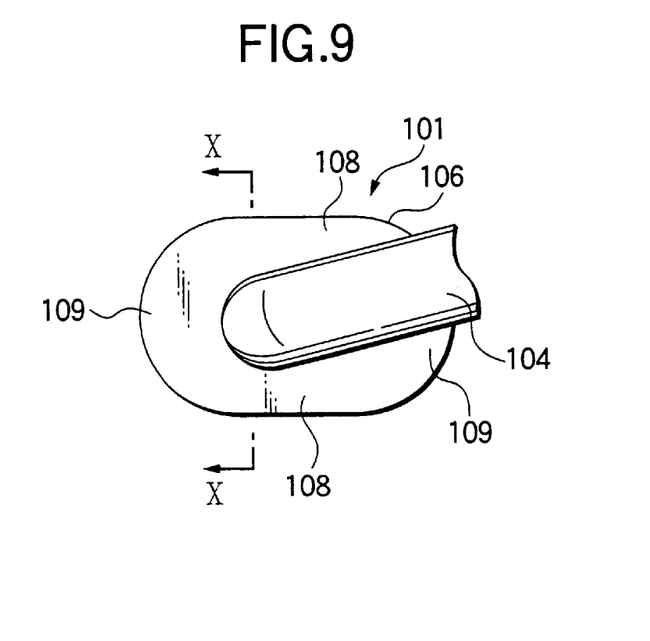
FIG. 9 is a plan view showing an important portion of a conventional grommet.
Figure 10:
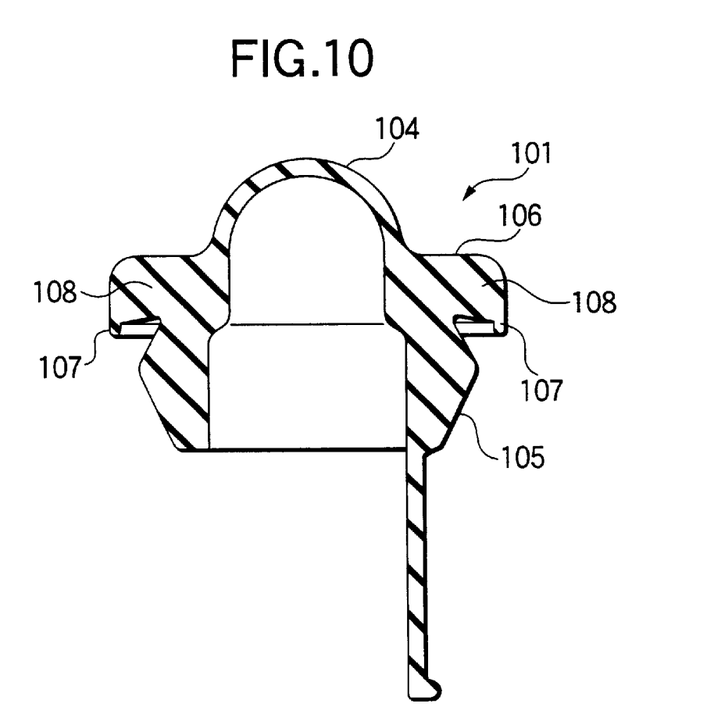
FIG. 10 is a cross-sectional view taken along the line X—X of FIG. 9.

The flange portion 106 extends generally radially outwardly from the grommet body 104 (and hence from the grommet 101). The flange portion 106 is formed on the grommet body 104 over the entire periphery thereof. The flange portion 106 includes a pair of straight portions 108, spaced from each other, and a pair of arcuate portions 109 which are spaced from each other, and interconnect the pair of straight portions 108.

Figure 12:
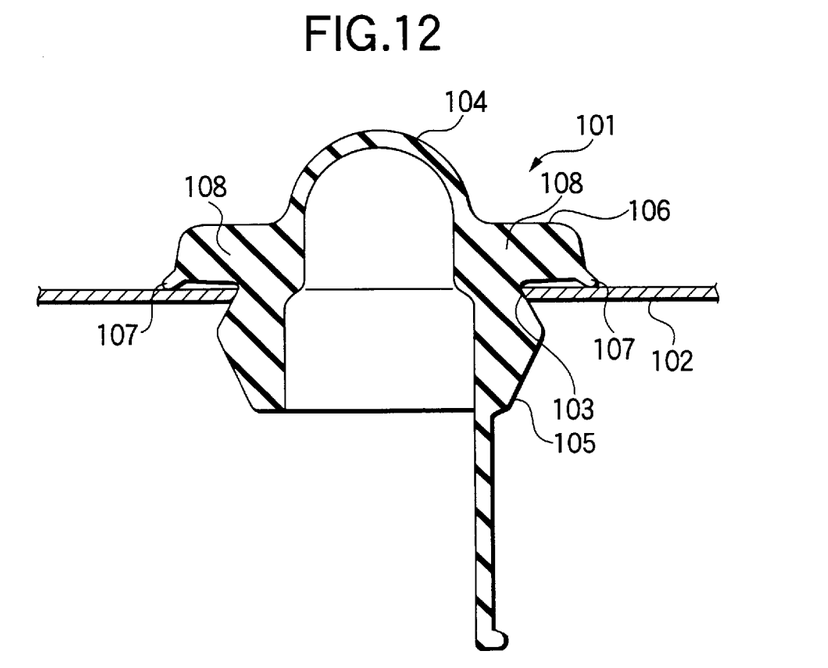
FIG. 12 is a cross-sectional view taken along the line XII—XII of FIG. 11.

The lip 107 is formed at an outer peripheral edge portion of the flange portion 106 over the entire periphery thereof. When the fitting portion 105 is fitted in the hole 103, the lip 107 is held in contact with the panel 102 as shown in FIG. 12. The lip 107 cooperates with the panel 102 to form a liquid-tight seal therebetween, thereby preventing a liquid, such as water, from intruding into the grommet body 104 through a gap between the lip 107 and the panel 102.

In order to ensure the waterproof property, the grommet 101 is molded of elastically-deformable rubber or the like. Therefore, particularly, the fitting portion 105 of the grommet 101 is formed into a size slightly larger than that of the hole 103.

Figure 11:
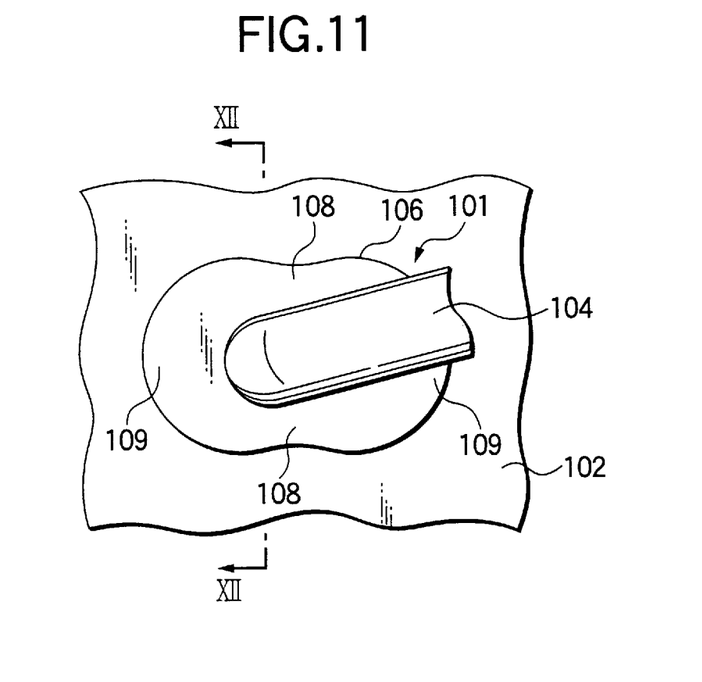
FIG. 11 is a plan view of the grommet of FIG. 9 mounted on a panel.

Therefore, when the fitting portion 105 is fitted in the hole 103, and is mounted on the panel 102 as shown in FIG. 12, the flange portion 106 is, in some cases, elastically deformed in such a manner that central portions of the pair of straight portions 108 are displaced toward the inside of the grommet body 104, as shown in FIG. 11. Thus, there was a fear that the conventional grommet 101 might detract from the appearance as a result of elastic deformation of the straight portions 108. And, this may cause the user of the automobile or others to have a double about the sealing performance of the grommet 101 although the lip 107 is held in intimate contact with the panel 102 to form a liquid-tight seal therebetween.

SUMMARY OF THE INVENTION

It is therefore an object of this invention to provide a grommet which will not detract from the appearance when the grommet is mounted on a vehicle body of a vehicle.

(1) In order to solve the above problem to achieve the object, the invention provides a grommet including a pair of straight portions, spaced from each other, and a pair of arcuate portions which are spaced from each other, and interconnect the pair of straight portions, the pair of straight portions and the pair of arcuate portions defining a space through which a wire harness is adapted to be passed; wherein the grommet includes a fitting portion of a tubular shape for fitting in a hole, formed in a panel forming a vehicle body of a vehicle, and the interior of the fitting portion is in communication with the space; characterized in that the grommet includes a lip which is formed at outer edge portions of the pair of straight portions and the pair of arcuate portions over an entire periphery thereof, and is adapted to be held in contact with the panel upon fitting of the fitting portion in the hole, thereby forming a liquid-tight seal between the lip and the panel; and a projected portion projecting outwardly from one of the pair of straight portions.

(2) The grommet of the invention, depending from (1), is characterized in that the projected portion is formed at a central portion of one of the pair of straight portions, and extends along a direction of spacing of the pair of arcuate portions from each other, and an amount of projecting of the projected portion from the associated straight portion is decreasing gradually toward each arcuate portion.

(3) According to the invention, there is provided a grommet including a pair of first straight portions, spaced from each other, and a pair of second straight portions which are spaced from each other, and interconnect the pair of first straight portions, the pair of first straight portions and the pair of second straight portions defining a space through which a wire harness is adapted to be passed; wherein the grommet includes a fitting portion of a tubular shape for fitting in a hole, formed in a panel forming a vehicle body of a vehicle, and the interior of the fitting portion is in communication with the space; characterized in that the grommet includes a lip which is formed at outer edge portions of the pair of first straight portions and the pair of second straight portions over an entire periphery thereof, and is adapted to be held in contact with the panel upon fitting of the fitting portion in the hole, thereby forming a liquid-tight seal between the lip and the panel; and a first projected portion projecting outwardly from one the pair of first straight portions.

(4) The grommet of the invention, depending from (3), is characterized in that the first projected portion is formed at a central portion of one of the pair of first straight portions, and extends along a direction of spacing of the pair of second straight portions from each other, and an amount of projecting of the first projected portion from the associated first straight portion is decreasing gradually toward each second straight portion.

(5) According to the invention, there is provided a grommet including a pair of first straight portions, spaced from each other, and a pair of second straight portions which are spaced from each other, and interconnect the pair of first straight portions, the pair of first straight portions and the pair of second straight portions defining a space through which a wire harness is adapted to be passed; wherein the grommet includes a fitting portion of a tubular shape for fitting in a hole, formed in a panel forming a vehicle body of a vehicle, and the interior of the fitting portion is in communication with the space; characterized in that the grommet includes a lip which is formed at outer edge portions of the pair of first straight portions and the pair of second straight portions over an entire periphery thereof, and is adapted to be held in contact with the panel upon fitting of the fitting portion in the hole, thereby forming a liquid-tight seal between the lip and the panel; and second projected portions projecting outwardly from the pair of second straight portions, respectively.

(6) The grommet of the invention, depending from according to (5), characterized in that the second projected portions are formed respectively at central portions of the pair of second straight portions, and extend along a direction of spacing of the pair of first straight portions from each other, and the amount of projecting of each second projected portion from the associated second straight portion is decreasing gradually toward each first straight portion.

(7) According to the invention, there is provided a grommet including a pair of first straight portions, spaced from each other, and a pair of second straight portions which are spaced from each other, and interconnect the pair of first straight portions, the pair of first straight portions and the pair of second straight portions defining a space through which a wire harness is adapted to be passed; wherein the grommet includes a fitting portion of a tubular shape for fitting in a hole, formed in a panel forming a vehicle body of a vehicle, and the interior of the fitting portion is in communication with the space; characterized in that the grommet includes a lip which is formed at outer edge portions of the pair of first straight portions and the pair of second straight portions over an entire periphery thereof, and is adapted to be held in contact with the panel upon fitting of the fitting portion in the hole, thereby forming a liquid-tight seal between the lip and the panel; first projected portions projecting outwardly from the pair of first straight portions, respectively; and second projected portions projecting outwardly from the pair of second straight portions, respectively.

(8) The grommet of the invention, depending from (7), is characterized in that the first projected portions are formed respectively at central portions of the pair of first straight portions, and extend along a direction of spacing of the pair of second straight portions from each other, and the amount of projecting of each first projected portion from the associated first straight portion is decreasing gradually toward each second straight portion; and the second projected portions are formed respectively at central portions of the pair of second straight portions, and extend along a direction of spacing of the pair of first straight portions from each other, and the amount of projecting of each second projected portion from the associated second straight portion is decreasing gradually toward each first straight portion.

In the grommet of the above (1), the projected portions project outwardly from the straight portions, respectively. Therefore, strain, developing when the grommet is mounted on the panel, is supported by the projected portions. The combined thickness of each projected portion and associated straight portion is the increased thickness, and therefore the straight portion is less liable to be elastically deformed.

The projected portions project outwardly from the straight portions, respectively, and therefore the projected portions will not adversely affect the deformability of the lip at all.

In the grommet of (2), the amount of projecting of each projected portion from the associated straight portion is decreasing gradually toward each arcuate portion. The projected portion is provided at the central portion of the straight portion. Therefore, the combined thickness of the projected portion and straight portion is the largest at the central portion of the straight portion. Therefore, when the grommet is mounted on the panel, the straight portions are less liable to be elastically deformed.

In the grommet of (3), the first projected portions project outwardly from the first straight portions, respectively. Therefore, strain, developing when the grommet is mounted on the panel, is supported by the first projected portions. The combined thickness of each first projected portion and associated first straight portion is the increased thickness, and therefore the first straight portion is less liable to be elastically deformed when the grommet is mounted on the panel.

The first projected portions project outwardly from the first straight portions, respectively, and therefore the first projected portions will not adversely affect the deformability of the lip at all.

In the grommet of (4), the amount of projecting of each first projected portion from the associated first straight portion is decreasing gradually toward each second straight portion. The first projected portion is provided at the central portion of the first straight portion. Therefore, the combined thickness of the first projected portion and first straight portion is the largest at the central portion of the first straight portion. Therefore, when the grommet is mounted on the panel, the first straight portions are less liable to be elastically deformed.

In the grommet of (5), the second projected portions project outwardly from the second straight portions, respectively. Therefore, strain, developing when the grommet is mounted on the panel, is supported by the second projected portions. The combined thickness of each second projected portion and associated second straight portion is the increased thickness, and therefore the second straight portion is less liable to be elastically deformed when the grommet is mounted on the panel.

The second projected portions project outwardly from the second straight portions, respectively, and therefore the second projected portions will not adversely affect the deformability of the lip at all.

In the grommet of (6), the amount of projecting of each second projected portion from the associated second straight portion is decreasing gradually toward each first straight portion. The second projected portion is provided at the central portion of the second straight portion. Therefore, the combined thickness of the second projected portion and second straight portion is the largest at the central portion of the second straight portion. Therefore, when the grommet is mounted on the panel, the second straight portions are less liable to be elastically deformed.

In the grommet of (7), the first projected portions project outwardly from the first straight portions, respectively, and the second projected portions project outwardly from the second straight portions, respectively. Therefore, strain, developing when the grommet is mounted on the panel, is supported by the first and second projected portions. The combined thickness of each first projected portion and associated first straight portion, as well as the combined thickness of each second projected portion and associated second straight portion, is the increased thickness, and therefore the first and second straight portions are less liable to be elastically deformed when the grommet is mounted on the panel.

The first projected portions project outwardly from the first straight portions, respectively, and the second projected portions project outwardly from the second straight portions, respectively, and therefore the first and second projected portions will not adversely affect the deformability of the lip at all.

In the grommet of (8), the combined thickness of the first projected portion and first straight portion is the largest at the central portion of the first straight portion. The combined thickness of the second projected portion and second straight portion is the largest at the central portion of the second straight portion. Therefore, when the grommet is mounted on the panel, the first and second straight portions are less liable to be elastically deformed.

DETAILED DESCRIPTION OF THE PREFERRED EMBODIMENTS

A first embodiment of a grommet of the present invention will now be described with reference to FIGS. 1 to 4. The grommet 1 (shown in FIGS. 1 to 4), forming the first embodiment of the invention, is mounted in a hole 3 (indicated in a broken line in FIG. 3) formed through a panel 2 (shown in FIG. 3) forming a vehicle body of a vehicle such as an automobile. The grommet 1 is formed into a tubular shape, and a wire harness, which is to be installed on the automobile, is passed through the inside of the grommet 1. The grommet 1 prevents moisture, such as water, from depositing on the wire harness. In the example shown in FIG. 3, the hole 3 is an elongate hole of a generally oval or elliptical shape.

Figure 1:
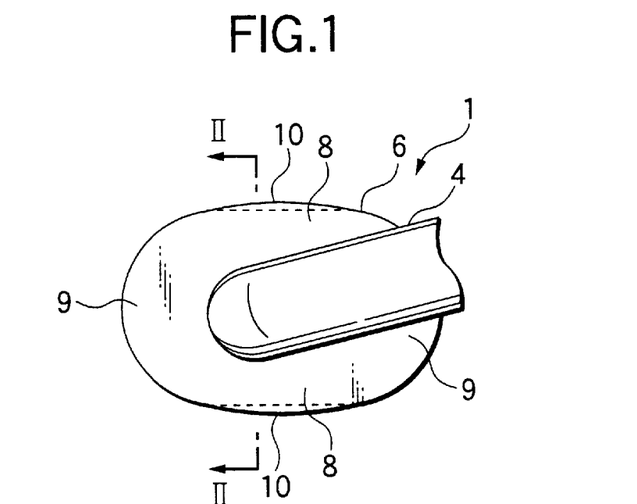
FIG. 1 is a plan view showing an important portion of a first embodiment of a grommet of the present invention.
Figure 4:
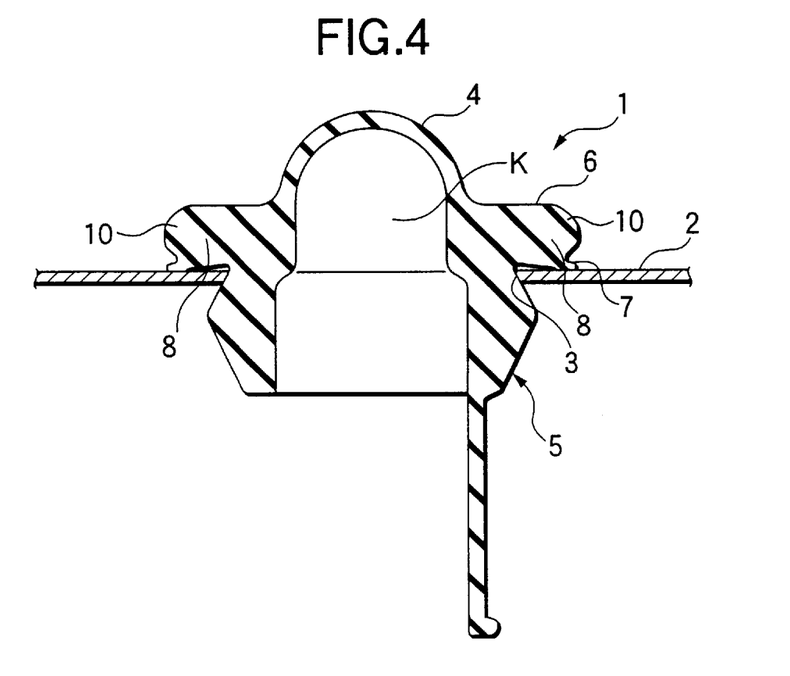
FIG. 4 is a cross-sectional view taken along the line IV—IV of FIG. 3.

The grommet 1 is made of elastically-deformable rubber or the like. As shown in FIG. 1, the grommet 1 of an integral construction includes a grommet body 4 of a tubular shape, a fitting portion 5 (shown in FIG. 2), a flange portion 6, a lip 7 (shown in FIG. 2), and projected portions 10. The wire harness is passed through the inside of the grommet body 4. The fitting portion 5 is formed at an end of the grommet body 4, and is fitted in the hole 3 as shown in FIG. 4. The fitting portion 5 of a tubular shape is varying in wall thickness gradually in a direction away from the grommet body 4. The interior of the fitting portion 5 is in communication with a space K (described later).

The flange portion 6 is formed at the end of the grommet body 4 at which the fitting portion 5 is formed. The flange portion 6 extends generally radially outwardly from the grommet body 4 at the end thereof. The flange portion 6 of an integral construction includes a pair of straight portions 8, and a pair of arcuate portions 9.

The pair of straight portions 8 are spaced from each other. The pair of straight portions 8 are disposed parallel to each other. The pair of arcuate portions 9 are spaced from each other. The arcuate portions 9 are connected at their opposite ends to the pair of straight portions 8. Thus, each of the arcuate portions 9 interconnects the pair of straight portions 8.

The pair of straight portions 8 and the pair of arcuate portions 9 are connected together in the above-mentioned manner, and the straight portions 8 and the arcuate portions 9 project generally radially outwardly from the grommet body 4. Therefore, the wire harness is passed through the space K (shown in FIGS. 2 and 4) defined by the pair of straight portions 8 and the pair of arcuate portions 9. The space K is in communication with the interior of the grommet body 4.

Figure 2:
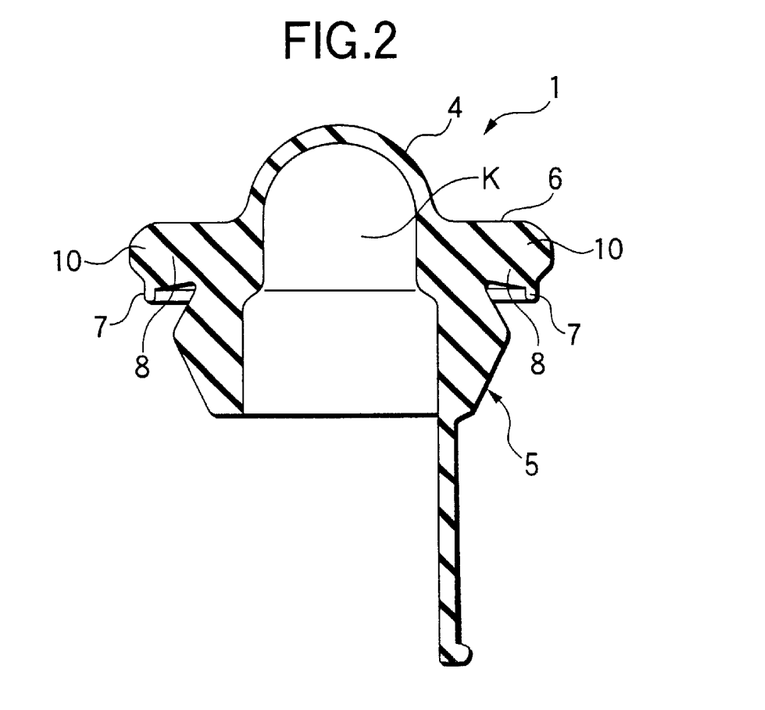
FIG. 2 is a cross-sectional view taken along the line II—II of FIG. 1.

The lip 7 is formed at outer edge portions of the two straight portions 8 and two arcuate portions 9 over the entire periphery. Namely, the lip 7 is formed at the outer peripheral edge portion of the flange portion 6 over the entire periphery thereof. When the fitting portion 5 is fitted in the hole 3, the lip 7 is held in contact with the panel 2, and is elastically deformed by the panel 2, with its distal end directed outwardly of the flange portion 6. The lip 7 cooperates with the panel 2 to form a liquid-tight seal therebetween, thereby preventing a liquid, such as water, from intruding into the fitting portion 5 and the grommet body 4 (that is, into the grommet 1).

The projected portions 10 project outwardly respectively from the pair of straight portions 8 of the flange portion 6 (that is, generally radially outwardly of the grommet 1). As shown in FIG. 1, the projected portions 10 are formed respectively at central portions of the pair of straight portions 8, and extend along the direction of opposing of the pair of arcuate portions 9 to each other (that is, the direction of spacing of the arcuate portions from each other). Each projected portion 10 is formed such that the amount of projecting of the projected portion 10 from the associated straight portion 8 is decreasing gradually toward each arcuate portion 9.

The projected portions 10 project from the straight portions 8 of the flange portion 6, respectively, and the lip 7 is formed at the outer peripheral edge portion of the flange portion 6. Therefore, the projected portions 10 are disposed immediately adjacent to the proximal end of the lip 7. Since each projected portion 10 projects from the associated straight portion 8 of the flange portion 6, the combined thickness of the straight portion 8 and projected portion 10 of the flange portion 6 is larger than the thickness of the arcuate portion 9. Since the amount of projecting of the projected portion 10 from the associated straight portion 8 is decreasing gradually toward each arcuate portion 9, the combined thickness of the straight portion 8 and projected portion 10 of the flange portion 6 is the largest at the central portion of the straight portion 8.

In this embodiment, the projected portions 10 project outwardly from the pair of the straight portions 8, respectively. The amount of projecting of the projected portion 10 from the associated straight portion 8 is decreasing gradually toward each arcuate portion 9. The projected portion 10 is provided at the central portion of the straight portion 8. The combined thickness of the projected portion 10 and straight portion 8 is the largest at the central portion of the straight portion 8.

Figure 3:
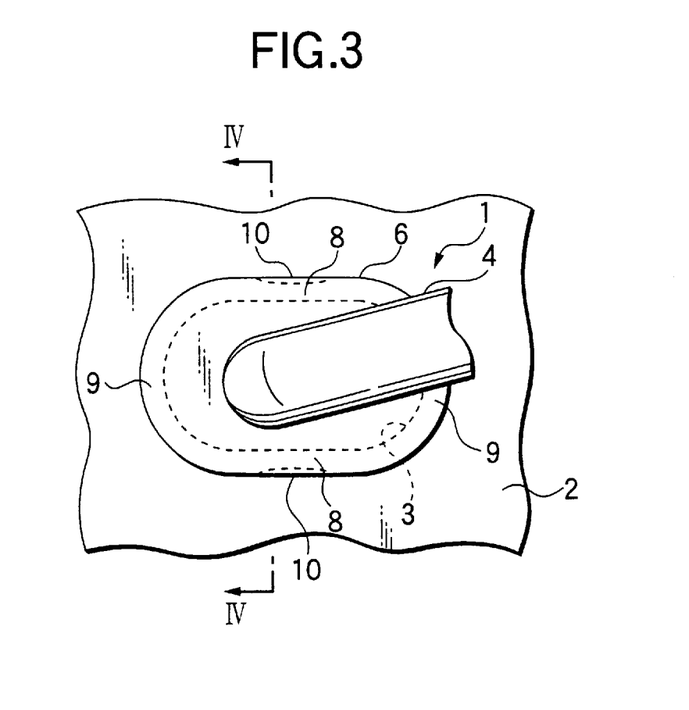
FIG. 3 is a plan view of the grommet of FIG. 1 mounted on a panel.

Therefore, strain, developing when the fitting portion 5 is fitted in the hole 3, and is mounted on the panel 2, is supported by the projected portions 10. Since the combined thickness of the projected portion 10 and straight portion 8 is the increased thickness, the straight portion 8 is less liable to be elastically deformed. Therefore, even if each straight portion 8 and its associated projected portion 10 are elastically deformed when the grommet is mounted on the panel 2, the straight portion 8 and the associated projected portion 10 become straight along the direction of spacing of the pair of arcuate portions 9 from each other, as shown in FIG. 3. Therefore, each straight portion 8 and the associated projected portion 10 will not be elastically deformed or recessed toward the inside of the grommet 1. Therefore, the grommet 1, when mounted on the panel 2, is prevented from detracting from the appearance.

Strain, developing when the grommet is mounted on the panel 2, is supported by the projected portions 10 and the straight portions 8. Therefore, when the grommet is mounted on the panel 2, the lip 7 is prevented from being deformed under the influence of the above strain. Therefore, the lip 7 can cooperate with the panel 2 to form a positive liquid-tight seal therebetween.

The projected portions 10 project outwardly from the pair of straight portions 8, respectively, and are disposed immediately adjacent to the proximal end of the lip 7. Therefore, the projected portions 10 will not adversely affect the deformability of the lip 7 at all. Therefore, the mounting of the grommet 1 on the panel 2 will not become difficult.

Next, a second embodiment of a grommet of the invention will be described with reference to FIGS. 5 to 8. Those constituent portions, identical to those of the first embodiment, will be designated by identical reference numerals, respectively, and explanation thereof will be omitted. In this embodiment, a hole 3, formed through a panel 2, has a generally rectangular shape. Four corners of the hole 3 have a generally arcuate shape.

Figure 5:
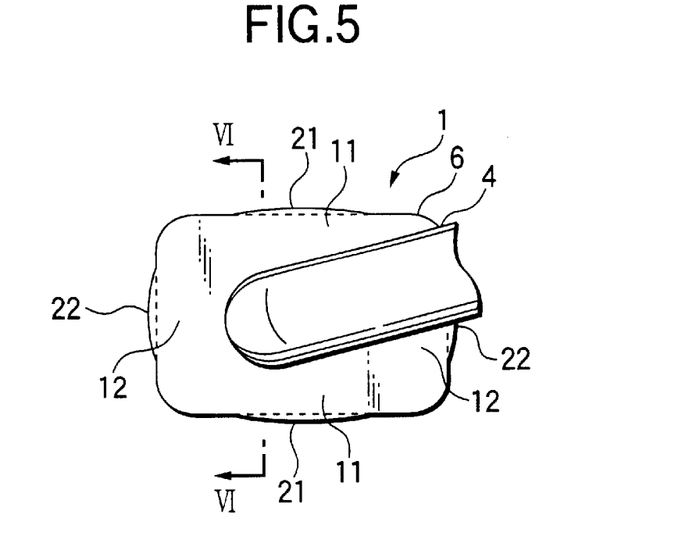
FIG. 5 is a plan view showing an important portion of a second embodiment of a grommet of the present invention.
Figure 6:
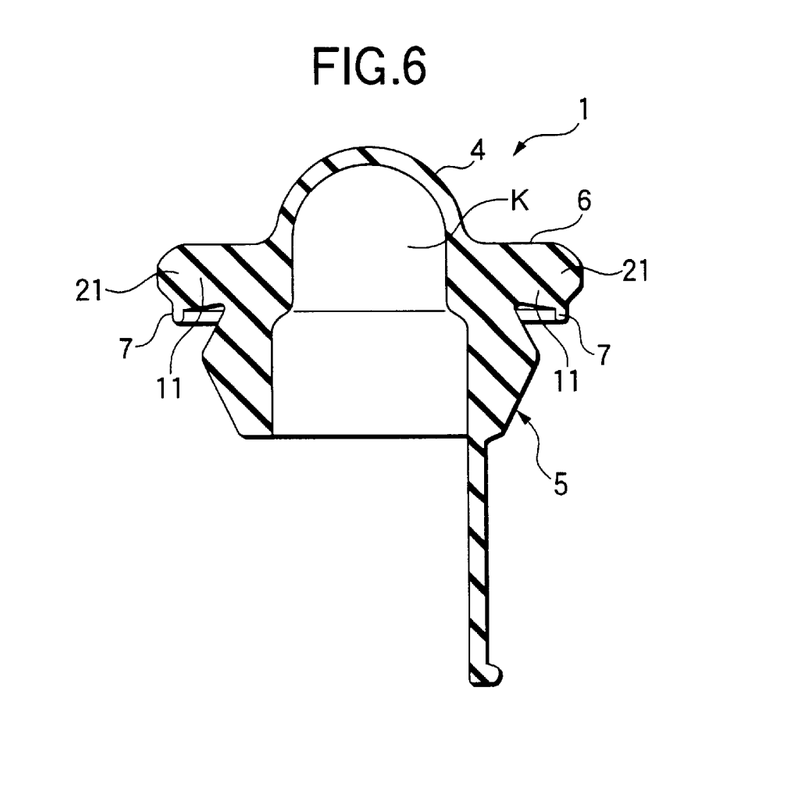
FIG. 6 is a cross-sectional view taken along the line VI—VI of FIG. 5.

A flange portion 6 of the grommet 1 of this embodiment has an integral construction, and includes a pair of first straight portions 11, and a pair of second straight portions 12, as shown in FIG. 5. The grommet 1 includes first projected portions 21 and second projected portions 22.

The pair of first straight portions 11 are spaced from each other. The pair of first straight portions 11 are disposed parallel to each other. The pair of second straight portions 12 are spaced from each other. The pair of second straight portions 12 are disposed parallel to each other. The second straight portions 12 are connected at their opposite ends to the pair of first straight portions 11. Thus, each of the second straight portions 12 interconnects the pair of first straight portions 11.

The pair of first straight portions 11 and the pair of second straight portions 12 are connected together, and the straight portions 11 and 12 project generally radially outwardly from a grommet body 4. Therefore, a wire harness is passed through a space K (shown in FIGS. 6 and 8) defined by the straight portions 11 and 12. The space K is in communication with the interior of the grommet body 4. The first straight portions 11 perpendicularly intersect the second straight portions 12. Four corner portions of the flange portion 6, at which the first straight portions 11 and the second straight portions 12 are connected together, have a generally arcuate shape.

The first projected portions 21 project outwardly respectively from the pair of first straight portions 11 of the flange portion 6 (that is, generally radially outwardly of the grommet 1). As shown in FIG. 5, the first projected portions 21 are formed respectively at central portions of the pair of first straight portions 11, and extend along the direction of opposing of the pair of second straight portions 12 to each other (that is, the direction of spacing of the second straight portions from each other). Each first projected portion 21 is formed such that the amount of projecting of the first projected portion 21 from the associated first straight portion 11 is decreasing gradually toward each second straight portion 12.

The second projected portions 22 project outwardly respectively from the pair of second straight portions 12 of the flange portion 6 (that is, generally radially outwardly of the grommet 1). As shown in FIG. 5, the second projected portions 22 are formed respectively at central portions of the pair of second straight portions 12, and extend along the direction of opposing of the pair of first straight portions 11 to each other (that is, the direction of spacing of the first straight portions from each other). Each second projected portion 22 is formed such that the amount of projecting of the second projected portion 22 from the associated second straight portion 12 is decreasing gradually toward each first straight portion 11.

A lip 7 is formed at outer edge portions of the two first straight portions 11 and two second straight portions 12 over the entire periphery. Namely, the lip 7 is formed at the outer peripheral edge portion of the flange portion 6 over the entire periphery thereof. The projected portions 21, 22 project from the straight portions 11, 12, respectively, and the lip 7 is formed at the outer peripheral edge portion of the flange portion 6. Therefore, the projected portions 21, 22 are disposed immediately adjacent to the proximal end of the lip 7. Since each projected portion 21, 22 projects from the associated straight portion 11, 12, the combined thickness of the projected portion 21, 22 and straight portion 11, 12 is the increased thickness. Since the amount of projecting of the projected portion 21 (22) from the associated straight portion 11 (12) is decreasing gradually toward each straight portion 12 (11), the combined thickness of the projected portion 21, 22 and straight portion 11, 12 is the largest at the central portion of the straight portion 11, 12.

In this embodiment, the first projected portions 21 project outwardly from the pair of the first straight portions 11, respectively. The amount of projecting of the first projected portion 21 from the associated first straight portion 11 is decreasing gradually toward each second straight portion 12. The first projected portion 21 is provided at the central portion of the first straight portion 11. The combined thickness of the first projected portion 21 and first straight portion 11 is the largest at the central portion of the first straight portion 11.

The second projected portions 22 project outwardly from the pair of the second straight portions 12, respectively. The amount of projecting of the second projected portion 22 from the associated second straight portion 12 is decreasing gradually toward each first straight portion 11. The second projected portion 22 is provided at the central portion of the second straight portion 12. The combined thickness of the second projected portion 22 and second straight portion 12 is the largest at the central portion of the second straight portion 12.

Therefore, strain, developing when a fitting portion 5 is fitted in the hole 3, and is mounted on the panel 2, is supported by the projected portions 21 and 22. Since the combined thickness of the projected portion 21, 22 and straight portion 11, 12 is the increased thickness, the straight portion 11, 12 is less liable to be elastically deformed. Therefore, even if each first straight portion 11 and its associated projected portion 21 are elastically deformed when the grommet is mounted on the panel 2, the first straight portion 11 and the associated projected portion 21 become straight along the direction of spacing of the pair of second straight portions 12 from each other, as shown in FIG. 7.

Figure 7:
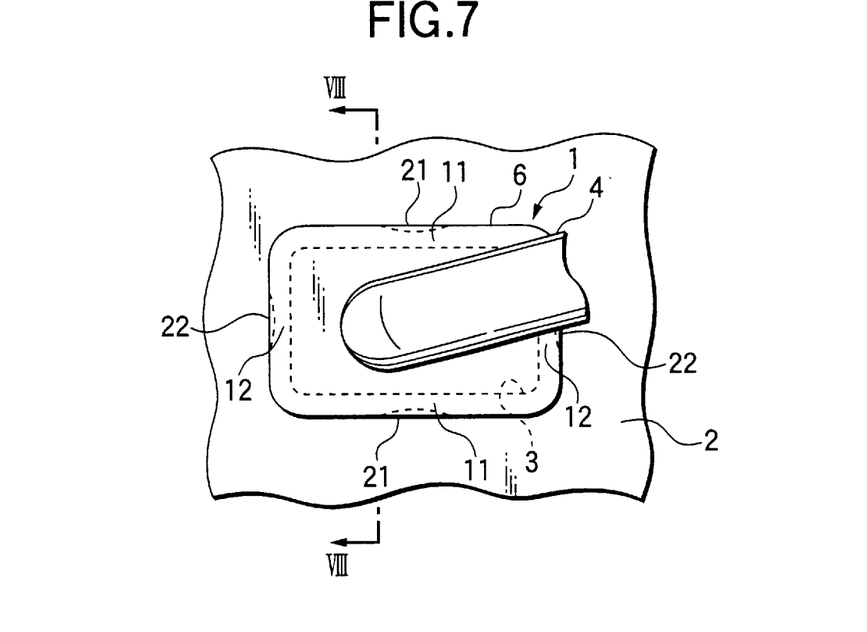
FIG. 7 is a plan view of the grommet of FIG. 5 mounted on a panel.
Figure 8:
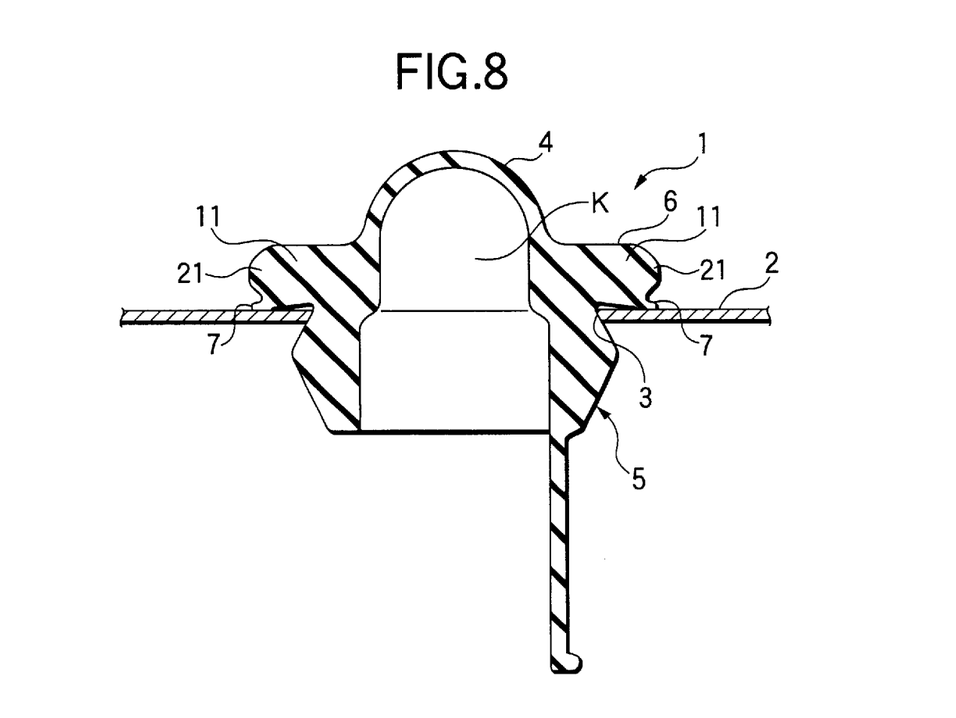
FIG. 8 is a cross-sectional view taken along the line VIII—VIII of FIG. 7.

Also, even if each second straight portion 12 and its associated projected portion 22 are elastically deformed when the grommet is mounted on the panel 2, the second straight portion 12 and the associated projected portion 22 become straight along the direction of spacing of the pair of first straight portions 11 from each other, as shown in FIG. 7. Therefore, each straight portion 11, 12 and the associated projected portion 21, 22 will not be elastically deformed toward the inside of the grommet 1. Therefore, the grommet 1, when mounted on the panel 2, is prevented from detracting from the appearance.

Strain, developing when the grommet is mounted on the panel 2, is supported by the projected portions 21 and 22 and the straight portions 11 and 12. Therefore, when the grommet is mounted on the panel 2, the lip 7 is prevented from being deformed under the influence of the above strain. Therefore, the lip 7 can cooperate with the panel 2 to form a positive liquid-tight seal therebetween.

Each projected portion 21, 22 projects outwardly from the associated straight portion 11, 12, and is disposed immediately adjacent to the proximal end of the lip 7. Therefore, the projected portions 21 and 22 will not adversely affect the deformability of the lip 7 at all. Therefore, the mounting of the grommet 1 on the panel 2 will not become difficult.

In the above second embodiment, the grommet 1 includes the first projected portions 21, projecting respectively from the first straight portions 11, and the second projected portions 22 projecting respectively from the second straight portions 12. In the present invention, however, there may be provided at least one of the pair of first projected portions 21 and the pair of second projected portions 22. Namely, only the first projected portions 21, or only the second projected portions 22, or both the first and second projected portions 21 and 22 may be provided.

In these cases, the straight portions 11, 12 are prevented from being recessed as described above for the second embodiment, thereby preventing the appearance from being spoiled. And besides, the elastic deformation of the lip 7 is suppressed, thereby preventing its waterproof effect from being lowered. In addition, the mounting of the grommet on the panel 2 will not become difficult.

As described above, in the invention, the projected portions project outwardly from the straight portions, respectively. Therefore, strain, developing when the grommet is mounted on the panel, is supported by the projected portions. The combined thickness of each projected portion and associated straight portion is the increased thickness, and therefore the straight portion is less liable to be elastically deformed. Therefore, even if each straight portion and its associated projected portion are elastically deformed when the grommet is mounted on the panel, the straight portion and the associated projected portion become straight along the direction of spacing of the pair of arcuate portions from each other. Therefore, the straight portion and the associated projected portion will not be elastically deformed or recessed toward the inside of the grommet. Therefore, the grommet, when mounted on the panel, is prevented from detracting from the appearance.

Strain, developing when the grommet is mounted on the panel, is supported by the projected portions. Therefore, when the grommet is mounted on the panel, the lip is prevented from being deformed under the influence of the above strain. Therefore, the lip can cooperate with the panel to form a positive liquid-tight seal therebetween.

The projected portions project outwardly from the straight portions, respectively, and therefore the projected portions will not adversely affect the deformability of the lip at all.

In the invention, the amount of projecting of each projected portion from the associated straight portion is decreasing gradually toward each arcuate portion. The projected portion is provided at the central portion of the straight portion. Therefore, the combined thickness of the projected portion and straight portion is the largest at the central portion of the straight portion. Therefore, when the grommet is mounted on the panel, the straight portions are less liable to be elastically deformed. Therefore, even if each straight portion and its associated projected portion are elastically deformed, the straight portion and the associated projected portion become straight along the direction of spacing of the pair of arcuate portions from each other. Therefore, the straight portion and the associated projected portion will not be elastically deformed or recessed toward the inside of the grommet. Therefore, the grommet, when mounted on the panel, is more positively prevented from detracting from the appearance.

In the invention, the first projected portions project outwardly from the first straight portions, respectively. Therefore, strain, developing when the grommet is mounted on the panel, is supported by the first projected portions. The combined thickness of each first projected portion and associated first straight portion is the increased thickness, and therefore the first straight portion is less liable to be elastically deformed when the grommet is mounted on the panel. Even if each first straight portion and its associated first projected portion are elastically deformed, the first straight portion and the associated first projected portion become straight along the direction of spacing of the pair of second straight portions from each other. Therefore, the first straight portion and the associated first projected portion will not be elastically deformed or recessed toward the inside of the grommet. Therefore, the grommet, when mounted on the panel, is prevented from detracting from the appearance.

Strain, developing when the grommet is mounted on the panel, is supported by the first projected portions. Therefore, when the grommet is mounted on the panel, the lip is prevented from being deformed under the influence of the above strain. Therefore, the lip can cooperate with the panel to form a positive liquid-tight seal therebetween.

The first projected portions project outwardly from the first straight portions, respectively, and therefore the first projected portions will not adversely affect the deformability of the lip at all.

In the invention, the amount of projecting of each first projected portion from the associated first straight portion is decreasing gradually toward each second straight portion. The first projected portion is provided at the central portion of the first straight portion. Therefore, the combined thickness of the first projected portion and first straight portion is the largest at the central portion of the first straight portion.

Therefore, when the grommet is mounted on the panel, the first straight portions are less liable to be elastically deformed. Therefore, even if each first straight portion and its associated first projected portion are elastically deformed, the first straight portion and the associated first projected portion become straight along the direction of spacing of the pair of second straight portions from each other. Therefore, the first straight portion and the associated first projected portion will not be elastically deformed or recessed toward the inside of the grommet. Therefore, the grommet, when mounted on the panel, is more positively prevented from detracting from the appearance.

In the invention, the second projected portions project outwardly from the second straight portions, respectively. Therefore, strain, developing when the grommet is mounted on the panel, is supported by the second projected portions. The combined thickness of each second projected portion and associated second straight portion is the increased thickness, and therefore when the grommet is mounted on the panel, the second straight portions are less liable to be elastically deformed. Therefore, even if each second straight portion and its associated second projected portion are elastically deformed, the second straight portion and the associated second projected portion become straight along the direction of spacing of the pair of first straight portions from each other. Therefore, the second straight portion and the associated second projected portion will not be elastically deformed or recessed toward the inside of the grommet. Therefore, the grommet, when mounted on the panel, is prevented from detracting from the appearance.

Strain, developing when the grommet is mounted on the panel, is supported by the second projected portions. Therefore, when the grommet is mounted on the panel, the lip is prevented from being deformed under the influence of the above strain. Therefore, the lip can cooperate with the panel to form a positive liquid-tight seal therebetween.

The second projected portions project outwardly from the second straight portions, respectively, and therefore the second projected portions will not adversely affect the deformability of the lip at all.

In the invention, the amount of projecting of each second projected portion from the associated second straight portion is decreasing gradually toward each first straight portion. The second projected portion is provided at the central portion of the second straight portion. Therefore, the combined thickness of the second projected portion and second straight portion is the largest at the central portion of the second straight portion. Therefore, when the grommet is mounted on the panel, the second straight portions are less liable to be elastically deformed. Therefore, even if each second straight portion and its associated second projected portion are elastically deformed, the second straight portion and the associated second projected portion become straight along the direction of spacing of the pair of first straight portions from each other. Therefore, the second straight portion and the associated second projected portion will not be elastically deformed or recessed toward the inside of the grommet. Therefore, the grommet, when mounted on the panel, is more positively prevented from detracting from the appearance.

In the invention, the first projected portions project outwardly from the first straight portions, respectively, and the second projected portions project outwardly from the second straight portions, respectively. Therefore, strain, developing when the grommet is mounted on the panel, is supported by the first and second projected portions. The combined thickness of each first projected portion and associated first straight portion, as well as the combined thickness of each second projected portion and associated second straight portion, is the increased thickness, and therefore the first and second straight portions are less liable to be elastically deformed when the grommet is mounted on the panel. Therefore, each first straight portion and its associated first projected portion, as well as each second straight portion and its associated second projected portion, even if elastically deformed, become straight, and will not be elastically deformed or recessed toward the inside of the grommet. Therefore, the grommet, when mounted on the panel, is prevented from detracting from the appearance.

Strain, developing when the grommet is mounted on the panel, is supported by the first and second projected portions. Therefore, when the grommet is mounted on the panel, the lip is prevented from being deformed under the influence of the above strain. Therefore, the lip can cooperate with the panel to form a positive liquid-tight seal therebetween.

The first projected portions project outwardly from the first straight portions, respectively, and the second projected portions project outwardly from the second straight portions, respectively, and therefore the first and second projected portions will not adversely affect the deformability of the lip at all. Therefore, the lip can cooperate with the panel to form a positive liquid-tight seal therebetween.

In the invention, the combined thickness of the first projected portion and first straight portion is the largest at the central portion of the first straight portion. The combined thickness of the second projected portion and second straight portion is the largest at the central portion of the second straight portion. Therefore, when the grommet is mounted on the panel, the first and second straight portions are less liable to be elastically deformed. Therefore, each first straight portion and its associated first projected portion, as well as each second straight portion and its associated second projected portion, even if elastically deformed, become straight, and will not be elastically deformed or recessed toward the inside of the grommet. Therefore, the grommet, when mounted on the panel, is more positively prevented from detracting from the appearance.

What is claimed is:

1. A grommet comprising:

a pair of straight portions spaced from each other;

a pair of arcuate portions which are spaced from each other and interconnect said pair of straight portions;

wherein said pair of straight portions and said pair of arcuate portions define a space through which a wire harness is to be passed;

a fitting portion of a tubular shape for fitting in a hole which is formed on a panel, an interior of said fitting portion being in communication with said space;

a lip which is formed at an outer edge portion of said pair of straight portions and said pair of arcuate portions over an entire periphery thereof, and which is adapted to be held in contact with said panel upon fitting of said fitting portion in said hole, thereby forming a liquid-tight seal between said lip and said panel; and a projected portion projecting outwardly from one of said pair of straight portions, wherein an angled surface of said fitting portion is in communication with a surface of each of said straight portions and a surface of each of said arcuate portions, which are in communication with a surface of said lip so as to define a second space to accomodate said hole in said panel.

2. A grommet according to claim 1, wherein said projected portion is formed at a central portion of one of said pair of straight portions, and extends along a direction of spacing of said pair of arcuate portions from each other, and an amount of projecting of said projected portion from the associated straight portion is decreasing gradually toward each arcuate portion.

3. The grommet according to claim 1, wherein said fitting portion is formed integrally with said pair of straight portions and said pair of arcuate portions.

4. The grommet according to claim 1, wherein said second space is formed over an entire periphery of said grommet.

5. The grommet according to claim 1, wherein said surface of said fitting portion is formed integrally with said surfaces of said straight portions and said surfaces of said arcuate portions, which are formed integrally with said surface of said lip.

6. A grommet comprising:
  a pair of first straight portions spaced from each other;
  a pair of second straight portions which are spaced from each other, and interconnect said pair of first straight portions;
  wherein said pair of first straight portions and said pair of second straight portions define a space through which a wire harness is to be passed;
  a fitting portion of a tubular shape for fitting in a hole, which is formed on a panel, and an interior of said fitting portion being in communication with said space;
  a lip which is formed at an outer edge portion of said pair of first straight portions and said pair of second straight portions over an entire periphery thereof, and which is adapted to be held in contact with said panel upon fitting of said fitting portion in said hole, thereby forming a liquid-tight seal between said lip and said panel; and
  a first projected portion projecting outwardly from said pair of first straight portion,
  wherein an angled surface of said fitting portion is in communication with a surface of each of said first straight portions and a surface of each of said second straight portions, which are in communication with a surface of said lip as to define a second space to accomodate said hole in said panel.

7. A grommet according to claim 6, wherein said first projected portion is formed at a central portion of one of said pair of first straight portions, and extends along a direction of spacing of said pair of second straight portions from each other, and an amount of projecting of said first projected portion from the associated first straight portion is decreasing gradually toward each second straight portion.

8. The grommet according to claim 6, wherein said fitting portion is formed integrally with said pair of first straight portions and said pair of second straight portions.

9. The grommet according to claim 6, wherein said second space is formed over an entire periphery of said grommet.

10. The grommet according to claim 6, wherein said surface of said fitting portion is formed integrally with said surfaces of said straight portions and said surfaces of said second straight portions, which are formed integrally with said surface of said lip.

11. A grommet comprising:
  a pair of first straight portions spaced from each other;
  a pair of second straight portions which are spaced from each other, and interconnect said pair of first straight portions;
  wherein said pair of first straight portions and said pair of second straight portions define a space through which a wire harness is to be passed;
  a fitting portion of a tubular shape for fitting in a hole which is formed in a panel, an interior of said fitting portion being in communication with said space;
  a lip which is formed at an outer edge portion of said pair of first straight portions and said pair of second straight portions over an entire periphery thereof, and which is adapted to be held in contact with said panel upon fitting of said fitting portion in said hole, thereby forming a liquid-tight seal between said lip and said panel; and
  a second projected portion projecting outwardly from said pair of second straight portions, and
  wherein an angled surface of said fitting portion is in communication with a surface of each of said first straight portions and a surface of each of said second straight portions, which are in communication with a surface of said lip so as to define a second space to accomodate said hole in said panel.

12. A grommet according to claim 11, wherein said second projected portion is formed at a central portion of one of said pair of second straight portions, and extends along a direction of spacing of said pair of first straight portions from each other, and an amount of projecting of said second projected portion from the associated second straight portion is decreasing gradually toward each first straight portion.

13. The grommet according to claim 11, wherein said fitting portion is formed integrally with said pair of first straight portions and said pair of second straight portions.

14. The grommet according to claim 11, wherein said second space is formed over an entire periphery of said grommet.

15. The grommet according to claim 11, wherein said surface of said fitting portion is formed integrally with said surfaces of said first straight portions and said surfaces of said second straight portions, which are formed integrally with said surface of said lip.

16. A grommet comprising:
  a pair of first straight portions spaced from each other;
  a pair of second straight portions which are spaced from each other, and interconnect said pair of first straight portions;
  wherein said pair of first straight portions and said pair of second straight portions define a space through which a wire harness is to be passed;
  a fitting portion of a tubular shape for fitting in a hole which is formed in a panel, an interior of said fitting portion being in communication with said space;
  a lip which is formed at an outer edge portion of said pair of first straight portions and said pair of second straight portions over an entire periphery thereof, and which is adapted to be held in contact with said panel upon fitting of said fitting portion in said hole, thereby forming a liquid-tight seal between said lip and said panel;
  a first projected portion projecting outwardly from one of said pair of first straight portions; and
  a second projected portion projecting outwardly from one of said pair of second straight portions,
  wherein an angled surface of said fitting portion is in communication with a surface of each of said first straight portions and a surface of each of said second straight portions, which are in communication with a surface of said lip so as to define a second space to accomodate said hole in said panel.

17. A grommet according to claim 16, wherein said first projected portion is formed at a central portion of one of said first straight portion, and extends along a direction of spacing of said pair of second straight portions from each other, and an amount of projecting of said first projected portion from the associated first straight portion is decreasing gradually toward each second straight portion; and said second projected portion is formed at a central portion of one of said second straight portion, and extends along a direction of spacing of said pair of first straight portions from each other, and an amount of projecting of said second projected portion from the associated second straight portion is decreasing gradually toward each first straight portion.

18. The grommet according to claim 16, wherein said fitting portion is formed integrally with said pair of first straight portions and said pair of second straight portions.

19. The grommet according to claim 16, wherein said second space is formed over an entire periphery of said grommet.

20. The grommet according to claim 16, wherein said surface of said fitting portion is formed integrally with said surfaces of said first straight portions and said surfaces of said second straight portions, which are formed integrally with said surface of said lip.

* * * * *